Figure 6:
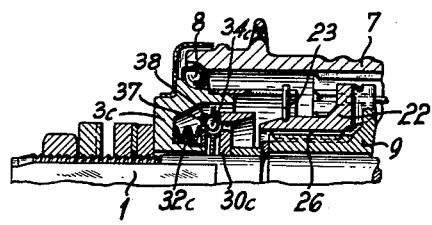

April 27, 1965  H. J. SCHWERDHÖFER  3,180,181
MULTIPLE-SPEED BICYCLE HUB
Filed Feb. 4, 1963  2 Sheets-Sheet 1
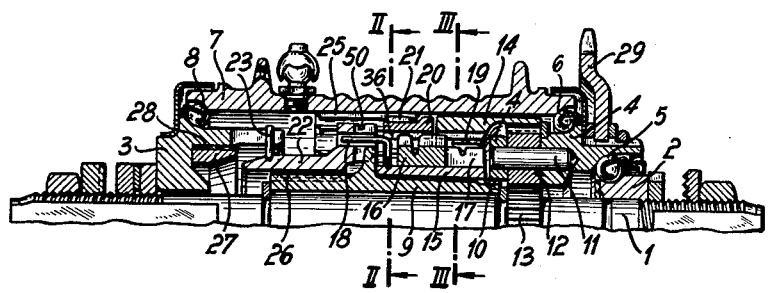
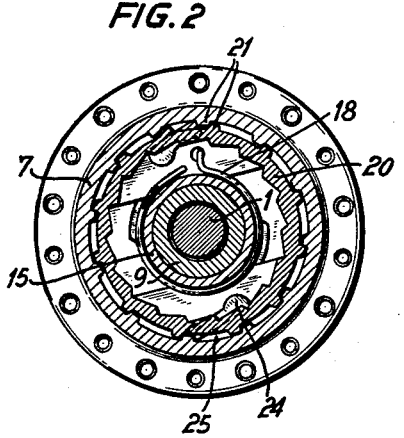
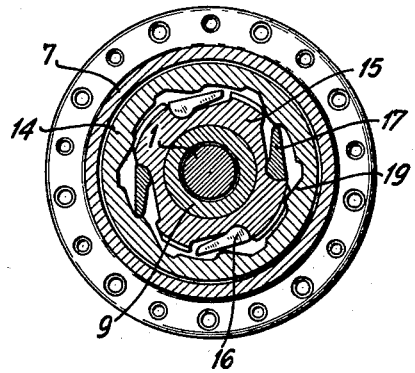
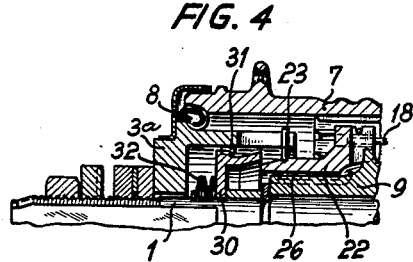
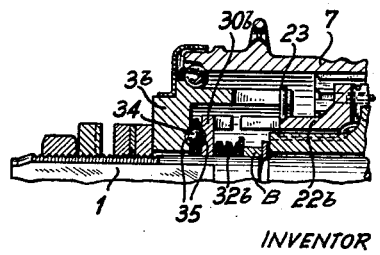
INVENTOR
Hans Joachim Schwerdhöfer April 27, 1965   H. J. SCHWERDHÖFER   3,180,181
MULTIPLE-SPEED BICYCLE HUB
Filed Feb. 4, 1963   2 Sheets-Sheet 2

INVENTOR
Hans Joachim Schwerdhöfer sty United States Patent Office 3,180,181
Patented Apr. 27, 1965

3,180,181
MULTIPLE-SPEED BICYCLE HUB
Hans Joachim Schwerdhöfer, Schweinfurt (Main), Germany, assignor to Fichtel & Sachs A.G., Schweinfurt (Main), Germany, a corporation of Germany
Filed Feb. 4, 1963, Ser. No. 255,834
Claims priority, application Germany, Feb. 7, 1962,
F 35,954
7 Claims. (Cl. 74—750)

This invention relates to a multiple-speed hub for bicycles, motorcycles, and the like, and more particularly to a multiple-speed hub in which the speed change is effected by an internal speed-changing mechanism under reverse pressure of the driven input member of the hub.

For instance, in known dual speed hubs, motive power is transmitted from pedals or an engine to a sprocket wheel which is fixedly connected to a driver member that is rotatable about a stationary hub shaft secured to the bicycle frame. The driver member is partly enveloped by a hub shell. A portion of the driver member projects beyond the hub shell and carries the sprocket wheel over which a drive chain is trained. The driver member is disposed between the sprocket wheel and planetary gearing means which consist essentially of a sun wheel, a planet wheel carrier, and planet wheels. The planetary gearing transmits rotary motion of the driver member to the hub shell. Wire spokes on the hub shell carry the rim of the driven bicycle wheel.

Bicycle hubs in which a speed change is initiated by back pedaling are known. While such hubs have the advantage of doing away with manual control elements and external cables, they have at the same time the disadvantage, unless equipped with a coaster brake, that the backward pedaling movement is not limited. Backward pedaling through a predetermined arc of pedal movement and the corresponding rotation of a driver member in the hub causes, in known constructions, say, a change from a first to a second speed, or a change in the transmission ratio in the hub gearing, and further back-pedaling may change the speed ratio back to the original value or to a third value, depending on the number of speeds available. In order to stop the reverse pedal movement when the desired speed change is effected, it has already been suggested to provide means for limiting the backward rotation of the driver member to a predetermined arc.

Such motion-limiting means include an abutment member which is caused to move axially in the hub during back-pedaling and to abut against a stationary member. Constructions of this kind, however, are exposed to injury. The hazard involved is due to the fact that when the abutment member and its stationary counterpart have touched each other, energetic back-pedaling may result in the destruction of parts of the transmission.

The primary object of the present invention is to provide a multiple speed bicycle hub of the type in which back-pedaling effects changes in speed and is normally limited to the arc necessary for a single speed change, and in which a possible breakage of transmission parts is prevented if strong backward pressure is applied to the pedals after they have traversed the arc necessary for the speed change.

Other objects of the invention will be apparent from the following description.

The specification is accompanied by drawings which show by way of example a number of embodiments of the invention and in which:

FIG. 1 is a sectioned elevation of one half of a multiple-speed hub according to the invention;
FIG. 2 is a section taken in the plane II—II of FIG. 1, but showing both halves;
FIG. 3 is a section taken in the plane III—III of FIG. 1;
FIG. 4 is a sectioned elevation of a detail of a modified hub;
FIGS. 5 through 8 are views similar to that of FIG. 4, illustrating four more modifications.

Referring to the drawings in greater detail now, and initially to FIGS. 1 to 3, there is shown a rear wheel hub of a bicycle of conventional external appearance. The working elements of the hub are mounted on a stationary shaft 1 which is adapted to be clamped in a fork of a bicycle frame. Most of the hub elements are enclosed in a hub shell 7 which extends coaxially with the shaft 1 and is rotatable. Over a sprocket 29 which projects beyond the hub shell a drive chain (not shown) is trained. Motive power is transmitted from pedals or an engine to the sprocket which is fixedly connected to a driver member 4 that is rotatable about the shaft 1. The driver member 4 forms the outer race for a ball bearing 5 and the inner race for a ball bearing 6. A bearing ring 2 forms the inner race of the ball bearing 5. An axially spaced bearing ring 3 forms the inner race for a ball bearing 8. The ball bearings 6 and 8 support the hub shell 7. The driver member 4 is formed as a planet wheel carrier of a planetary gearing. Planet wheels 12 are rotatably mounted on shafts 11 which are secured to the driver member 4. The planetary gearing includes further a sun wheel 13 coaxially fixed on the shaft 1, and a ring gear 14. The planet wheels 12 of which only one is visible in FIG. 1 mesh simultaneously with the sun wheel 13 and the ring gear 14, as is conventional.

Next to the sun wheel 13, an interior driver member 9 is rotatably mounted on the shaft 1, and a pawl carrier 15, in turn, is rotatably mounted on the interior driver member 9. The interior driver member 9 is connected to to the driver member 4 by a coupling 10. The pawl carrier 15 carries two angularly offset groups of pawls 16 and 17, respectively. The pawls 17, as can be seen from FIGS. 1 and 3, engage the interior face 19 of the ring gear 14. The pawls 16, too, engage the interior ratchet face 19 of the ring gear 14, but, in addition, they also engage teeth 36 of a ratchet ring 20. This ring 20 is coupled to the hub shell 7 by means of circumferentially spaced teeth on the ring 20 and the hub shell 7 which jointly constitute a coupling 21. The spacing of the teeth is such, as can best be seen from FIG. 2, that there is a certain lost motion between the ratchet ring 20 and the hub shell 7.

The interior driver member 9, as seen from FIG. 1, is permanently coupled to the driver member 4. Mounted on the interior driver member 9, by means of threads 26, is an abutment member 22 which is secured to the bearing ring 3, by a clamping spring 23 which constitutes a freewheeling clutch device. The abutment member 22 can freely rotate with the interior driver member 9 during forward pedaling but is yieldably prevented by the spring 23 from rotating during back-pedaling.

An abutment ring 27 which is radially slitted resiliently engages a friction facing 28 in a bore of the bearing ring 3. The annular friction facing exerts a radial force upon the abutment ring 27. The abutment member 22 and the abutment ring 27 have corresponding conical faces which are conformingly engageable by relative axial movement.

There is a pawl mechanism provided on the abutment member 22. Of this pawl mechanism only a spring ring 50 is seen in FIG. 1. The pawls (not shown) are in a permanent engagement with a ratchet 25 on the hub shell 7.

Between the abutment member 22 and the pawl carrier 15, a clamping spring 18 provides another freewheeling device, very similar to the freewheeling device of the spring 23. The spring 18 which can be clearly seen in FIG. 2 is formed so as to admit, during forward pedaling, rotation of the pawl carrier 15 relative to the abutment member 22 and the interior driver member 9, but to impede rotation of the pawl carrier during backward pedaling.

The operation of the hub of FIGS. 1 to 3 is as follows:

In FIG. 1 the hub is shown in direct gear. Torque is developed over the sprocket 29 and the driver member 4. The latter drives the interior driver member 9. In the driving position, shown in FIG. 1, the abutment member 22 is far to the right and is driven by the interior driver member 9. Torque is transmitted from the abutment member 22 over the pawl mechanism at 50 and the ratchet 25 to the hub shell 7. The ring gear 14 of the planetary gearing rotates at a higher speed and overtravels the pawls 17 which engage the interior face 19 of the ring gear. The pawls 16 extend for a portion of their axial length along the ring gear 14 and for the rest of their length along the coupling 21. In the position shown, the pawls 16 are disengaged from the teeth 36 of the ratchet ring 20 because they lie against teeth on the interior ratchet face 19 of the ring gear 14, as can clearly be seen from FIG. 3.

A speed change is initiated by back-pedaling. During back-pedaling the ring gear 14 rotates while the pawl carrier 15 is held fast by the clamping spring 18, the clamping spring 23, and the bearing ring 3. Due to the relative motion between the ring gear 14 and the pawl carrier 15, thus caused, the tips of the pawls 16 enter depressed portions of the interior face 19 of the ring gear 14. These depressed portions are so deep that the pawls 16 can now engage the teeth 36 of the ratchet ring 20. When the pawls 16 engage the teeth 36, and forward pedaling again takes place, the pawls 16 are driven by the ring gear 14 at increased speed, and transmit torque over the ratchet ring 20 to the hub shell 7, whereas the pawls on the abutment member 22 rotate at a lower speed, and are overtaken at 50 by the quicker rotating hub shell.

Back-pedaling for the purpose of changing speeds is normally limited to the arc required by the speed change during which the tips of the pawls 16 travel from the teeth of the ratchet face 19 into the depressed face portions, or from the latter to the former. The speed change movement is normally blocked by the abutment member 22. Since, during back pedaling, the abutment member 22 is prevented from rotating by the clamping spring 23, while the interior driver member 9 does rotate, the abutment member 22 moves axially on the threads 26 until it strikes the abutment ring 27, whereby the ring 27 is subjected to an axial force and then to torque. A further axial movement being blocked, the abutment member 22 tends to rotate together with the interior driver 9. The clamping spring 23 is designed to be so weak as not to prevent rotation of the abutment member 22. When the rotary moment produced by back-pedaling assumes a certain magnitude, it will cause the abutment ring 27 to rotate with the abutment member 22, against the frictional restraint of the friction facing 28. Thus, energetic back-pedaling cannot produce an overload condition and the destruction of hub parts.

If the abutment ring 27 were rigidly connected to, or integrally formed with, the bearing member 3, engagement of the conical surfaces of the abutment member 22 and the abutment ring 3 under strong axial pressure would prevent rotation of the abutment member 22. A too forcible back-pedaling would necessarily lead to the destruction of parts of the drive. The abutment ring 27 is a conventional tolerance compensator ring. The friction facing 28 may be replaced by radially acting spring means. The slitted ring 27 and the friction facing 28 serve as an overload coupling.

FIG. 4 shows a modified overload coupling or safety device. On back-pedaling, the abutment member 22 engages an abutment ring 30 which is secured against rotation by radially projecting teeth 31 provided on the ring 30 and a bearing ring 3a. The abutment member 22, together with the ring 30, is axially movable against cup springs 32 interposed between the rings 30 and 3a. Upon an axial shift of the abutment ring 30 over a certain distance, the teeth 31 of the ring 30 and bearing ring 3a are disengaged so that rotation of the abutment ring 30 becomes possible.

In the modification of FIG. 5, the abutment member 22b engages the abutment ring 30b by axially projecting claws. When the abutment member 22b which is yieldably secured against rotation by the clamping spring 23, as is the abutment member 22 of FIGS. 1 to 4, hits the ring 30b, it cannot move on in an axial direction, and starts to rotate by overcoming the locking action of the clamping spring 23. The claws of the abutment member 22b and abutment ring 30b engage each other. The abutment ring 30b is retained against rotation by a ball catch 34. The balls of this catch, carried by a holder, are urged by spring force to enter depressions 35 in the abutment ring 30b and bearing ring 3b. The spring force is produced by cup springs 32b which bear, on one side, on a bushing B mounted on shaft 1 and, on the other side, on the abutment ring 30b. When the abutment ring 30b is given an increased rotary moment by the abutment member 22b, the ball catch will yield. The balls 34 will withdraw from the referred to depressions, and the abutment ring 30b will rotate.

In the overload coupling indicated in FIG. 6, the abutment member 22 and the abutment ring 30c engage each other frictionally along a conical interface. The ring 30c is secured against rotation by a ball catch 34c, the balls of which engage depressions or holes 37 in the abutment ring 30c and a ring plate 38. This ring plate is axially biased and secured against rotation by cup springs 32c which are disposed between the bearing ring 3c and ring plate 38.

Figure 7:
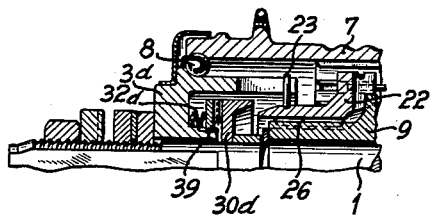

In the construction shown in FIG. 7, the abutment ring 30d is provided on its frontal face with notches and teeth which are adapted to engage matingly shaped formations on a disc 39. The disc 39 is secured against rotation in a similar manner as the ring plate 38 of FIG. 6.

Figure 8:
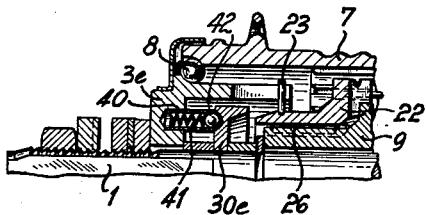

In regard to the construction of FIG. 8, it is to be noted that helical springs 41 are used instead of the cup springs shown in FIGS. 4 to 7. The springs 41 are received in sleeves 40 and act upon balls 42 partly seated in depressions in the abutment ring 30e.

It is believed that the construction and operation of the multiple-speed bicycle hub of my present invention, as well as the many advantages thereof, will be fully understood from the showing of a few forms for practicing the invention, and the foregoing detailed description. Some of the features are reviewed hereinafter. The overload coupling of the invention is especially advantageously used in multiple-speed hubs in which an abutment member is screwed onto a hub part that rotates during back-pedaling. The abutment member is, however, prevented from taking part in the rotation during back-pedaling; instead, it moves axially until it contacts another abutment member. The two abutment members are formed to engage each other frictionally or to interlock each other.

For instance, in the modification shown in FIGS. 1 to 3, the second abutment member is axially immovable and secured to a bearing member by a torsional overload coupling against rotation. In some of the modifications shown, the torsional overload coupling is formed as a ball catch, the balls being received in matingly shaped depressions in adjacent parts. In the construction of FIG. 5, the adjacent parts are a bearing part and the second abutment member, and according to FIG. 6, the adjacent parts are the plate 38 and the second abutment member, the plate 38 being under spring force and being axially movable but not rotatable. Similarly, the disc 39 of FIG. 7 is axially movable but not rotatable. In the embodiments of FIGS. 5 and 8, the second abutment member is axially movable. According to FIG. 4, the second abutment member is axially movable and locked for a portion of such movement against rotation.

It will be apparent that while I have shown and described my invention in a few forms only, many changes and modifications may be made without departing from the spirit of the invention defined in the following claims.

I claim:

1. A multiple speed hub for bicycles, motorcycles, and the like, comprising:
   (a) a stationary shaft having an axis;
   (b) a driver member rotatable about said shaft in forward and backward directions;
   (c) a hub shell coaxially supported on said shaft for rotation about said axis;
   (d) variable speed transmission means operatively interposed between said driver member and said hub shell for rotating said hub shell when said driver member rotates in said forward direction, and responsive to the backward rotation of said driver member through a predetermined arc for changing the transmission ratio thereof;
   (e) a first abutment member;
   (f) connecting means operatively connecting said driver member and said first abutment member for selectively axially moving said abutment member during movement of said driver member in said backward direction;
   (g) a second abutment member abuttingly engageable by said first abutment member when the same is moved axially by said connecting means; and
   (h) overload coupling means operatively connecting said second abutment member to said shaft for preventing joint movement of said abutment members during backward rotation of said driver member when the same is rotated in said backward direction with a predetermined torque, and for permitting said joint movement when said driver member is rotated in said backward direction with a torque greater than said predetermined torque.

2. In the hub according to claim 1, said first abutment member being threadedly connected to said driver member, and freewheeling clutch means operatively interposed between said shaft and said first abutment member for permitting rotary movement of said first abutment member with said driver member during forward rotation of said driver member, the axial movement of said first abutment member during backward rotation of said driver member being a threaded movement relative to said driver member, and said joint movement of said abutment members being a rotary movement about said axis.

3. In the hub according to claim 2, said first and second abutment members being adapted to engage each other frictionally upon axial movement of said first abutment member.

4. In the hub according to claim 2, said first and second abutment members being provided with complementary projections, said complementary projections engaging each other upon axial movement of said first abutment member.

5. In the hub according to claim 2, a bearing member fixed on said shaft and having an interior space defined by an annular face of said bearing member, said second abutment member being a ring received in said space, said overload coupling means being interposed between said ring and said annular face and exerting a radial force upon said ring.

6. In the hub according to claim 2, a bearing member fixed on said shaft, resilient means interposed between said bearing member and said second abutment member, said bearing member and second abutment member being provided with complementary engaging means extending in an axial direction, the axial movement of said first abutment member being directed against the force of said resilient means, and serving to disengage said engaging means.

7. In the hub according to claim 2, a bearing member fixed on said shaft, said overload coupling means including a ball disposed between said bearing member and second abutment member, said bearing member and second abutment member being provided with respective depressions to receive said ball, and resilient means urging said bearing and second abutment members toward each other.

No references cited.

DON A. WAITE, *Primary Examiner.*